(12) United States Patent
Dong et al.

(10) Patent No.: US 11,828,675 B2
(45) Date of Patent: Nov. 28, 2023

(54) TESTING DEVICE FOR FLEXIBLE SCREEN

(71) Applicant: KUNSHAN GO-VISIONOX OPTO-ELECTRONICS CO., LTD, Jiangsu (CN)

(72) Inventors: Shuanzhu Dong, Kunshan (CN); Manna Liu, Kunshan (CN)

(73) Assignee: KUNSHAN GO-VISIONOX OPTO-ELECTRONICS CO., LTD, Kunshan (CN)

( * ) Notice: Subject to any disclaimer, the term of this patent is extended or adjusted under 35 U.S.C. 154(b) by 75 days.

(21) Appl. No.: 17/667,971

(22) Filed: Feb. 9, 2022

(65) Prior Publication Data

US 2022/0170814 A1 Jun. 2, 2022

Related U.S. Application Data

(63) Continuation of application No. PCT/CN2020/128086, filed on Nov. 11, 2020.

(30) Foreign Application Priority Data

Jan. 10, 2020 (CN) .......................... 202010027388.X

(51) Int. Cl.
*G01M 11/08* (2006.01)
*G01N 3/26* (2006.01)

(52) U.S. Cl.
CPC .............. *G01M 11/08* (2013.01); *G01N 3/26* (2013.01)

(58) Field of Classification Search
CPC . G01N 3/26; G01L 5/04; G01L 5/045; G01M 11/08
See application file for complete search history.

(56) References Cited

U.S. PATENT DOCUMENTS 10,971,042 B2 * 4/2021 Zhao .................. G01R 31/2642
2015/0033870 A1   2/2015 Lee
(Continued)

FOREIGN PATENT DOCUMENTS

CN    203629786 A    6/2014
CN    204330366 U    5/2015
(Continued)

OTHER PUBLICATIONS

Extended European Search Report dated Nov. 11, 2022, in corresponding European Application No. 20912181.3; 9 pages.
(Continued)

*Primary Examiner* — Erika J. Villaluna
(74) *Attorney, Agent, or Firm* — Maier & Maier, PLLC

(57) ABSTRACT

An apparatus for testing a flexible screen. The apparatus for testing a flexible screen includes a slide rail, a reel, a clamping module and a drive module. The reel is fixed to one end of the slide rail. The axial direction of the reel is perpendicular to the extension direction of the slide rail. The flexible screen includes a first end and a second end which are disposed opposite to each other. The reel is configured to fix the first end of the flexible screen and rotate to drive the flexible screen to fit to the reel and coil around the reel. The clamping module is configured to clamp the second end of the flexible screen. The reel is further configured to rotate to drive, through the flexible screen, the clamping module to slide along the slide rail towards the reel.

20 Claims, 3 Drawing Sheets

(56) References Cited

U.S. PATENT DOCUMENTS

| | | |
|---|---|---|
| 2016/0223444 A1 | 8/2016 | Pagani et al. |
| 2017/0309226 A1 | 10/2017 | In et al. |
| 2019/0297175 A1 | 9/2019 | Lin et al. |

FOREIGN PATENT DOCUMENTS

| | | | |
|---|---|---|---|
| CN | 102645378 B | | 6/2015 |
| CN | 106157816 A | | 11/2016 |
| CN | 107860561 A | | 3/2018 |
| CN | 207133130 U | * | 3/2018 |
| CN | 207263446 U | | 4/2018 |
| CN | 107993573 A | | 5/2018 |
| CN | 108225938 A | | 6/2018 |
| CN | 109388193 A | | 2/2019 |
| CN | 109520714 A | | 3/2019 |
| CN | 109743421 A | | 5/2019 |
| CN | 110118697 A | | 8/2019 |
| CN | 209342509 U | | 9/2019 |
| CN | 209416663 U | | 9/2019 |
| CN | 111122132 A | | 5/2020 |
| KR | 101680875 B1 | | 11/2016 |
| KR | 20190005302 A | | 1/2019 |

OTHER PUBLICATIONS

International Search Report dated Feb. 18, 2021 in corresponding International Application No. PCT/CN2020/128086; 6 pages.

First Office Action dated Feb. 3, 2021 in corresponding Chinese Application No. 202010027388.X; 13 pages.

Second Office Action dated Jun. 17, 2021 in corresponding Chinese Application No. 202010027388.X; 14 pages.

Third Office Action dated Sep. 8, 2021 in corresponding Chinese Application No. 202010027388.X; 12 pages.

* cited by examiner

TESTING DEVICE FOR FLEXIBLE SCREEN

CROSS-REFERENCE TO RELATED APPLICATIONS

This is a continuation of International Patent Application No. PCT/CN2020/128086, filed on Nov. 11, 2020, which claims priority to Chinese Patent Application No. 202010027388.X filed on Jan. 10, 2020, disclosures of both of which are incorporated herein by reference in their entireties.

TECHNICAL FIELD

The present application relates to the field of display technology, for example, an apparatus for testing a flexible screen.

BACKGROUND

With the development of display technology and the improvement of people's living standards, flexible screens are becoming the development trend of display screens in the future.

However, when a testing device for evaluating the coiling performance of a flexible screen clamps the flexible screen, it is easy to cause uneven force at two ends of the screen and damage the flexible screen. Moreover, during a coil testing, the testing device tends to cause locally uneven force of the screen body of the flexible screen, resulting in local bulging and deformation of the screen body. Furthermore, during the coil testing, the screen body of the flexible screen bends at a large angle at the reel at the initial coiling stage, resulting in uneven force. Consequently, the problem of a large error in evaluating the coiling characteristic of the screen body of the flexible screen occurs in the testing device.

SUMMARY

The present application provides an apparatus for testing a flexible screen to alleviate the problem of a large error in evaluating the curl characteristic of the screen body of the flexible screen.

An embodiment of the present application provides an apparatus for testing a flexible screen. The apparatus includes a slide rail, a reel, a clamping module and a drive module.

The apparatus for testing a flexible screen includes a reel. The reel is secured to an end of the slide rail. An axial direction of the reel is perpendicular to an extension direction of the slide rail. The flexible screen includes a first end and a second end which are disposed opposite to each other. The reel is configured to fix the first end of the flexible screen and rotate to drive the flexible screen to fit to the reel and coil around the reel.

The apparatus for testing a flexible screen includes a clamping module. The clamping module is configured to clamp the second end of the flexible screen. The reel is further configured to rotate to drive, through the flexible screen, the clamping module to slide along the slide rail towards the reel. The clamping module includes a pressure sensing sub-module. The pressure sensing sub-modules are configured to detect tension force received by the flexible screen in the extension direction of the slide rail and generate a tension detection signal.

The apparatus for testing a flexible screen includes a drive module. The drive module adjusts a rotation angular velocity the reel according to the received tension detection signal.

The apparatus for testing a flexible screen provided in the embodiment of the present application includes the slide rail, the reel, the clamping module and the drive module. The reel is secured to an end of the slide rail in the extension direction of the slide rail. The axial direction of the reel is perpendicular to the extension direction of the slide rail. The flexible screen includes the first end and the second end which are disposed opposite to each other. The reel is configured to fix the first end of the flexible screen. The reel is configured to rotate to drive the flexible screen to fit to the reel and coil around the reel. The clamping module is configured to clamp the second end of the flexible screen. The reel rotates to drive, through the flexible screen, the clamping module to slide along the slide rail towards the reel. The clamping module includes pressure sensing sub-modules. The pressure sensing sub-module is configured to detect the tension force received by the flexible screen in the extension direction of the slide rail and generate the tension detection signal. The drive module adjusts the rotation angular velocity of the reel according to the received tension detection signal. In the apparatus for testing a flexible screen according to the embodiment of the present application, the clamping module includes the pressure sensing sub-module configured to detect the tension force received by the flexible screen in the extension direction of the slide rail and generate the tension detection signal and the drive module is configured to adjust the rotation angular velocity of the reel according to the received tension detection signal. In this manner, the problem of a large error in evaluating the curl characteristic of the screen body of the flexible screen is alleviated.

DETAILED DESCRIPTION

Figure 1:
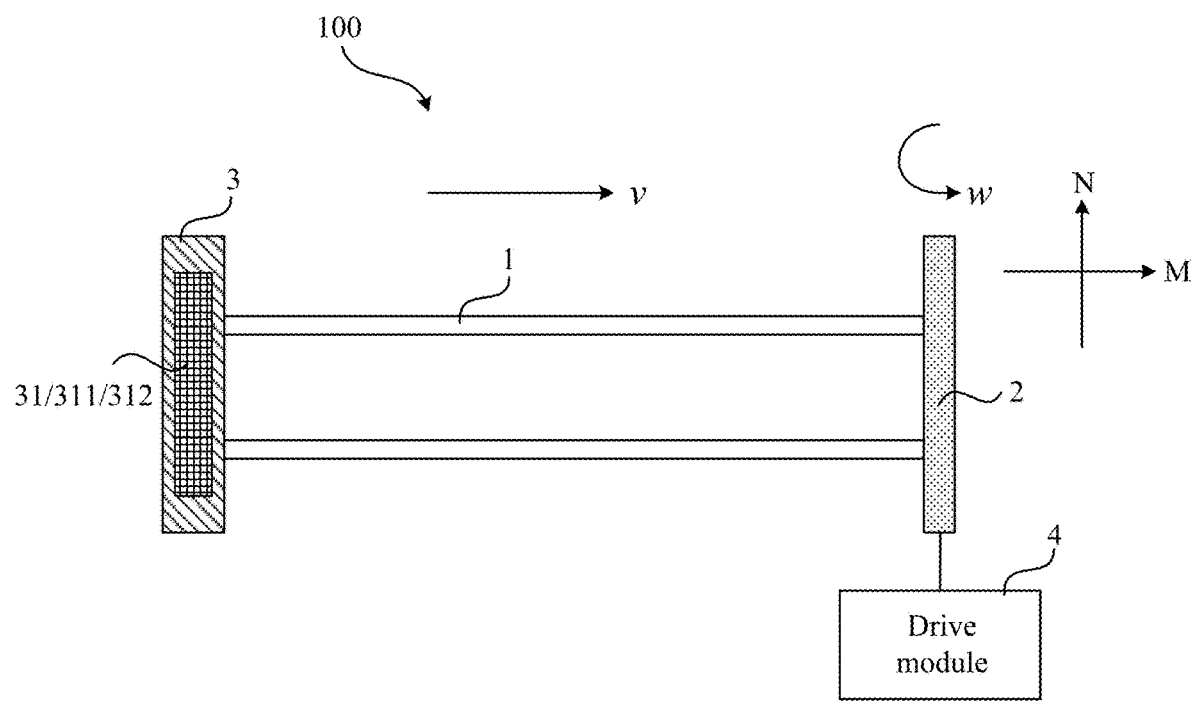
FIG. 1 is a top view illustrating the structure of an apparatus for testing a flexible screen according to an embodiment of the present application.

The present application is described hereinafter in conjunction with drawings and embodiments. The embodiments described herein are merely intended to explain, and not to limit, the present application. For ease of description, only part, not all, of the structures related to the present application are illustrated in the drawings.

When the testing device for evaluating the coiling performance of the flexible screen clamps the flexible screen, it is easy to cause uneven force at two ends of the screen and damage the flexible screen. During the coil testing, the testing device is also easy to cause locally uneven force of the screen body of the flexible screen, resulting in the local bulging and deformation of the screen body. Moreover, the testing device is also easy to cause the screen body of the flexible screen to bend at a large angle at the reel at the initial coil stage, resulting in uneven force. Therefore, the testing device has the problem of large error in evaluating the coil characteristic of the screen body of the flexible screen.

The embodiment below proposes a structure of the apparatus for testing a flexible screen, which can solve the preceding problems.

Figure 2:
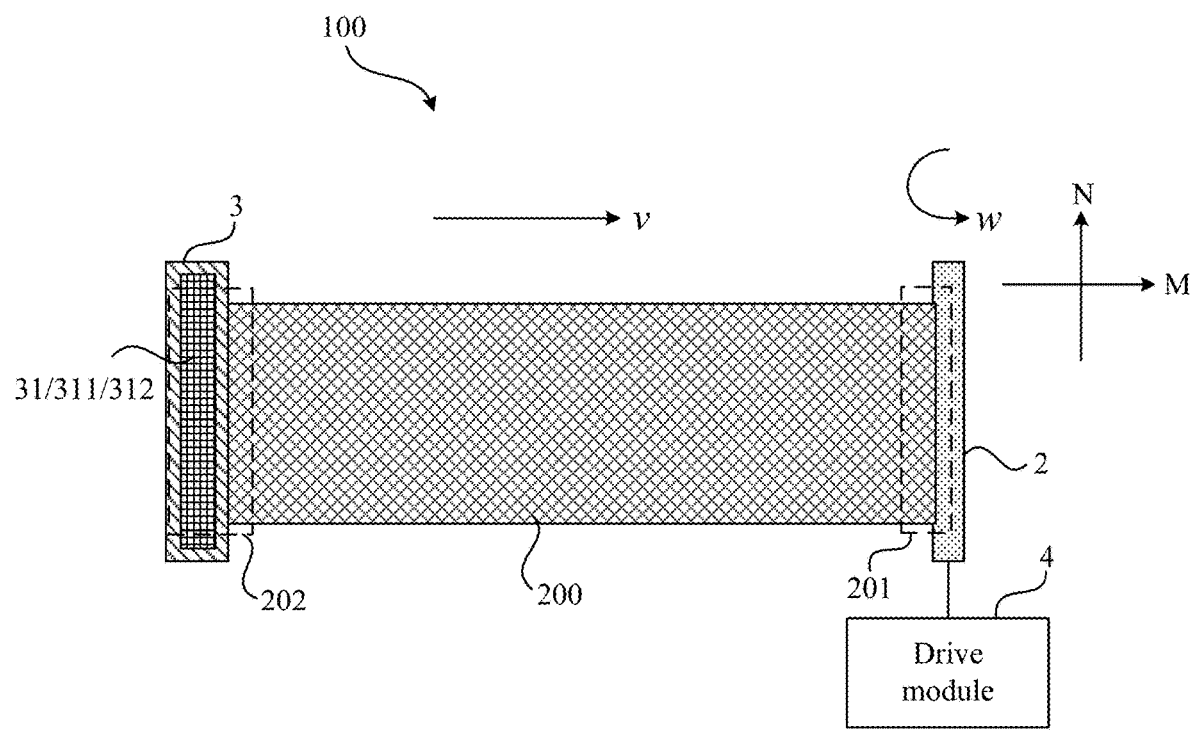
FIG. 2 is a top view illustrating the structure of an apparatus for testing a flexible screen according to an embodiment of the present application when the apparatus performs a coil testing on the flexible screen.
Figure 3:
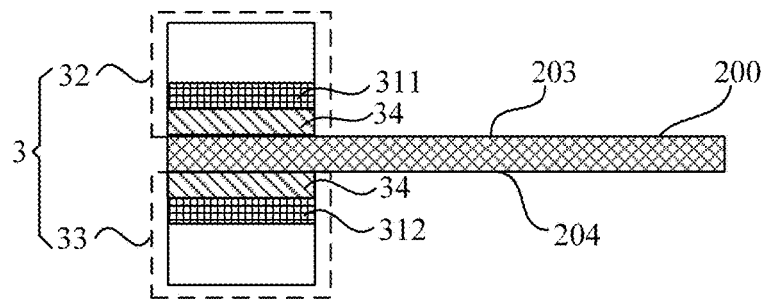
FIG. 3 is a side view illustrating the structure of the clamping module of an apparatus for testing a flexible screen according to an embodiment of the present application.

FIG. 1 is a top view illustrating the structure of the apparatus for testing a flexible screen according to an embodiment of the present application. FIG. 2 is a top view illustrating the structure of the apparatus for testing a flexible screen according to an embodiment of the present application when performing the curl testing on the flexible screen. Referring to FIG. 1 and FIG. 2, the apparatus for testing a flexible screen 100 provided in this embodiment of the present application includes the slide rail 1, the reel 2, the clamping module 3, and the drive module 4. The reel 2 is secured to an end of the slide rail 1 in the extension direction M of the slide rail 1. The axial direction N of the reel 2 is perpendicular to the extension direction M of the slide rail 1. The flexible screen 200 includes the first end 201 and the second end 202 which are disposed opposite to each other. The reel 2 is configured to fix the first end 201 of the flexible screen 200. The reel 2 is configured to rotate to drive the flexible screen 200 to fit to the reel 2 and coil around the reel 2. The clamping module 3 is configured to clamp the second end 202 of the flexible screen 200. The reel 2 rotates to drive, through the flexible screen, the clamping module 3 to slide along the slide rail 1 towards the reel 2. FIG. 3 is a side view illustrating the structure of the clamping module of the apparatus for testing a flexible screen according to an embodiment of the present application. Referring to FIG. 3, the clamping module 3 includes a first clamping module 32 and a second clamping module 33 which are disposed opposite to each other. The first clamping module 32 includes a first pressure sensing sub-module 311. The second clamping module 33 includes a second pressure sensing sub-module 312. The first pressure sensing sub-module 311 and the second pressure sensing sub-module 312 can be collectively referred to as the pressure sensing sub-module 31. The pressure sensing sub-module 31 is configured to detect the tension force received by the flexible screen 200 in the extension direction M of the slide rail 1 and generate the tension detection signal. The drive module 4 adjusts the rotation angular velocity ω of the reel 2 according to the received tension detection signal.

The flexible screen 200 includes the first end 201 and the second end 202 which are disposed opposite to each other. The reel 2 of the testing apparatus 100 of the flexible screen 200 secures the first end 201 of the flexible screen 200. The clamping module 3 clamps the second end 202 of the flexible screen 200. The drive module 4 controls the rotation of the reel 2 to drive the flexible screen 200 to fit to the reel 2 and coil around the reel 2. At the same time, the flexible screen 200 drives the clamping module 3 to slide along the slide rail 1 towards the reel 2. Since the clamping module 3 includes the pressure sensing sub-module 31, the pressure sensing sub-module 31 can detect the tension force received by the flexible screen 200 in the extension direction M of the slide rail 1 during the curl testing of the flexible screen 200 by the testing apparatus 100 of the flexible screen 200, and the pressure sensing sub-module 31 can generate the tension detection signal according to the detected tension of the flexible screen 200. The tension detection signal can correspond to several situations: the tension force is within a testing threshold range, the tension is greater than the testing threshold range, or the tension force is less than the testing threshold range. The drive module 4 adjusts the angular velocity of the rotation of the reel 2 according to the received tension detection signal.

In an embodiment, the apparatus 100 can be disposed that when the tension force corresponding to the tension detection signal received by the drive module 4 is within the testing threshold range, the drive module 4 maintains the rotation angular velocity ω of the reel 2. When the tension force corresponding to the tension detection signal received by the drive module 4 is greater than a maximum value of the testing threshold range, the drive module 4 reduces the rotation angular velocity ω of the reel 2. When the tension force corresponding to the tension detection signal received by the drive module 4 is less than a minimum value of the testing threshold range, the drive module 4 increases the rotation angular velocity ω of the reel 2. During a coiling process, the tension force of the flexible screen 200 in the extension direction M of the slide rail 1 is kept constant by the pressure sensing sub-module 31, so as to improve the stability of the flexible screen 200, ensure the smooth coil testing of the flexible screen 200, and prevent the evaluation of the coli characteristic of the flexible screen 200 from being affected by the local bulging of the flexible screen 200.

In an embodiment, referring to FIG. 3, the first clamping module 32 and the second clamping module 33 are located on two sides of the clamped portion of the flexible screen 200.

The clamping module 3 clamps two sides of the second end 202 of the flexible screen 200 through the first clamping module 32 and the second clamping module 33. The first pressure sensing sub-module 311 included in the first clamping module 32 is configured to detect the tension force received by a side of the second end 202 of the flexible screen 200 facing the first clamping module 32 in the extension direction M of the slide rail 1, and generate a first tension detection signal. The second pressure sensing sub-module 312 included in the second clamping module 33 is configured to detect the tension force received by a side of the second end 202 of the flexible screen 200 facing the second clamping module 33 in the extension direction M of the slide rail 1, and generate a second tension detection signal. The drive module 4 generates the tension detection signal according to the received first tension detection signal and the second tension detection signal. The drive module 4 adjusts the rotation angular velocity ω of the reel 2 according to the tension detection signal.

The tension detection signal includes the first tension detection signal and the second tension detection signal. When each of the tension force corresponding to the first tension detection signal and the tension force corresponding to the second tension detection signal received by the drive module 4 is within the testing threshold range, the drive module 4 maintains the rotation angular velocity ω of the reel 2. When the tension force corresponding to the first tension detection signal and/or the tension force corresponding to the second tension detection signal received by the drive module 4 are/is greater than the maximum value of the testing threshold range, the drive module 4 reduces the rotation angular velocity ω of the reel 2. When the tension force corresponding to the first tension detection signal and/or the tension force corresponding to the second tension detection signal received by the drive module 4 are/is less than the minimum value of the testing threshold range, the drive module 4 increases the rotation angular velocity ω of the reel 2

The first pressure sensing sub-module 311 of the first clamping module 32 and the second pressure sensing sub-module 312 of the second clamping module 33 improve the detection accuracy of the tension force by the pressure sensing sub-module 31, better keep the tension force of the flexible screen 200 in the extension direction M of the slide rail 1 constant during the curling process, improve the stability of the flexible screen 200 during the coiling process, ensure the smooth curl testing of the flexible screen 200, and improve the evaluation of the coil characteristic of the flexible screen 200.

In an embodiment, each of the first pressure sensing sub-module 311 and the second pressure sensing sub-module 312 includes a resistance strain gauge. The resistance strain gauge can detect the tension force received by the flexible screen 200 in the extension direction M of the slide rail 1, and convert the detected tension signal into an electrical signal to generate the tension detection signal. The resistance strain gauge included in the first pressure sensing sub-module 311 correspondingly generates the first tension detection signal. The resistance strain gauge included in the second pressure sensing sub-module 312 correspondingly generates the second tension detection signal.

In an embodiment, referring to FIG. 3, the first clamping module 32 and/or the second clamping module 33 include/includes a vacuum adsorbent layers 34. The vacuum adsorbent layer 34 is disposed in contact with a corresponding surface of the flexible screen 200. The vacuum adsorbent layer 34 is configured to perform vacuum adsorption on the corresponding surface. The vacuum adsorbent layer 34 is located on a side of the corresponding pressure sensing sub-module 31 facing the flexible screen 200.

The vacuum adsorbent layer 34 included in the first clamping module 32 is disposed in contact with the corresponding surface of the flexible screen 200. The corresponding surface of the flexible screen 200 can be an upper surface 203 of the flexible screen 200. Due to the presence of the vacuum adsorbent layer 34, the pressure on the corresponding surface of the flexible screen 200 disposed in contact with the vacuum adsorbent layer 34, that is, the upper surface 203 of the flexible screen 200, is really small and approximately zero. The flexible screen 200 is tightly adsorbed by the vacuum adsorbent layer 34 included in the first clamping module 32, so as to strengthen the force on the screen body of the flexible screen 200 and reduce the damage of the clamping module 3 to the contact position of the second end 202 of the flexible screen 200.

In an embodiment, the vacuum adsorbent layer 34 included in the second clamping module 33 is disposed in contact with a corresponding surface of the flexible screen 200. The corresponding surface of the flexible screen 200 can be a lower surface 204 of the flexible screen 200. Due to the presence of the vacuum adsorbent layer 34, the pressure on the corresponding surface of the flexible screen 200 disposed in contact with the vacuum adsorbent layer 34, that is, the lower surface 204 of the flexible screen 200, is really small and approximately zero. The flexible screen 200 is tightly adsorbed by the vacuum adsorbent layer 34 included in the second clamping module 33, so as to strengthen the force on the screen body of the flexible screen 200 and reduce the damage of the clamping module 3 to the contact position of the second end 202 of the flexible screen 200.

In an embodiment, each of the first clamping module 32 and the second clamping module 33 includes a vacuum adsorbent layer 34. Due to the presence of the vacuum adsorbent layer 34 of the first clamping module 32 and the vacuum adsorbent layer 34 of the second clamping module 33, the pressures on the corresponding surfaces of the flexible screen 200 disposed in contact with the vacuum adsorbent layers 34. The upper surface and the lower surface 204 of the flexible screen 200 are really small and approximately zero. The flexible screen 200 is tightly adsorbed by the vacuum adsorbent layer 34 included in the first clamping module 32 and the vacuum adsorbent layer 34 included in the second clamping module 33, so as to strengthen the force on the screen body of the flexible screen 200 and reduce the damage of the clamping module 3 to the contact position of the second end 202 of the flexible screen 200. FIG. 3 illustrates the case where each of the first clamping module 32 and the second clamping module 33 includes a vacuum adsorbent layer 34.

Figure 4:
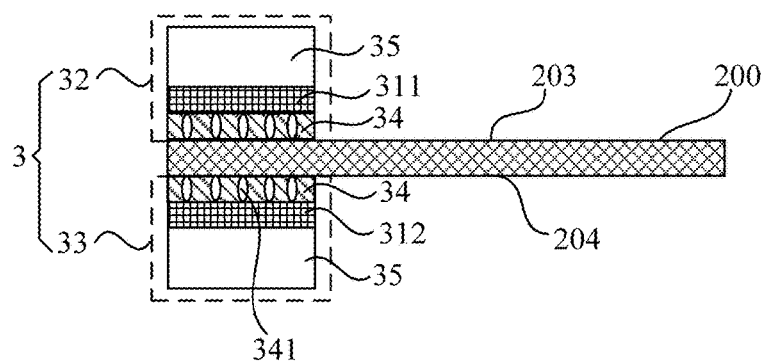
FIG. 4 is another side view illustrating the structure of the clamping module of an apparatus for testing a flexible screen according to an embodiment of the present application.

In an embodiment, FIG. 4 is another side view illustrating the structure of the clamping module of the apparatus for testing a flexible screen according to an embodiment of the present application. Referring to FIG. 4, each of the first clamping module 32 and the second clamping module 33 includes a vacuum adsorbent layer 34. The vacuum adsorbent layers 34 include a plurality of vacuum adsorbent holes 341 in contact with the corresponding surface. The vacuum adsorbent holes 341 in the first clamping module 32 and the vacuum adsorbent holes 341 in the second clamping module 33 are disposed in a one-to-one correspondence in a direction in which the first clamping module 32 and the second clamping module 33 are disposed opposite to each other.

The vacuum adsorbent layers 34 include the plurality of vacuum adsorbent holes 341, an edge of a side wall of each of the plurality of vacuum absorbent holes is in contact with the corresponding surface. The vacuum adsorbent holes 341 are evacuated. The vacuum adsorbent holes 341 in the first clamping module 32 and the vacuum adsorbent holes 341 in the second clamping module 33 are disposed in a one-to-one correspondence. Therefore, the upper surface 203 and the lower surface 204 of the flexible screen 200 are adsorbed tightly through the vacuum adsorbent holes 341 disposed in a one-to-one correspondence, which improves the clamping ability of the clamping module 3 to the flexible screen 200 and strengthens the securing of the flexible screen 200. Moreover, with the arrangement in which the vacuum adsorbent holes 341 in the first clamping module 32 and the vacuum adsorbent holes 341 in the second clamping module 33 are disposed in a one-to-one correspondence, the uniformity of the force on the flexible screen 200 is improved, and the damage to the flexible screen 200 during the curl testing of the flexible screen 200 is reduced.

In an embodiment, the vacuum adsorbent layer 34 is a flexible material layer. When the clamping module 3 of the flexible screen 200 secures the flexible screen 200, the flexible material layer can serve a protective and cushioning function for the flexible screen 200. The vacuum adsorbent hole 341 is located on the flexible material layer. Therefore, the second end 202 of the flexible screen 200 can be uniformly forced to prevent local bulging during the curling process. The flexible material layer can be such as silica gel, ethylene propylene diene monomer or the like.

In an embodiment, referring to FIG. 4, each of the first clamping module 32 and the second clamping module 33 includes a resilient element 35. The two resilient elements 35 are disposed opposite to each other. The two resilient elements 35 are located on two sides of the clamped portion of the flexible screen 200. One resilient element 35 of the resilient elements 35 is located on a side of the corresponding pressure sensing sub-module 31 facing away from the flexible screen 200. For example, the resilient element 35 includes a spring.

The resilient element 35 is located on a side of the corresponding pressure sensing sub-module 31 facing away from the flexible screen 200. The resilient element 35 is configured to secure the pressure sensing sub-module 31 to the clamping module 3. The flexible screen 200 is clamped and secured on the clamping module 3 by the resilient elements 35 located on two sides of the clamped portion of the flexible screen 200. The resilient element 35 includes the spring that has a certain resilientity. The testing apparatus can be disposed that when the spring is compressed, the first clamping module 32 and the second clamping module 33 of the clamping module 3 are conveniently opened. The flexible screen 200 is placed between the first clamping module 32 and the second clamping module 33. When the spring is extended, the first clamping module 32 and the second clamping module 33 of the clamping module 3 are conveniently closed. The flexible screen 200 is clamped between the first clamping module 32 and the second clamping module 33. Therefore, the flexible screen 200 is conveniently secured during the testing. The flexible screen 200 is conveniently separated from the clamping module 3 at the end of the testing.

Figure 5:
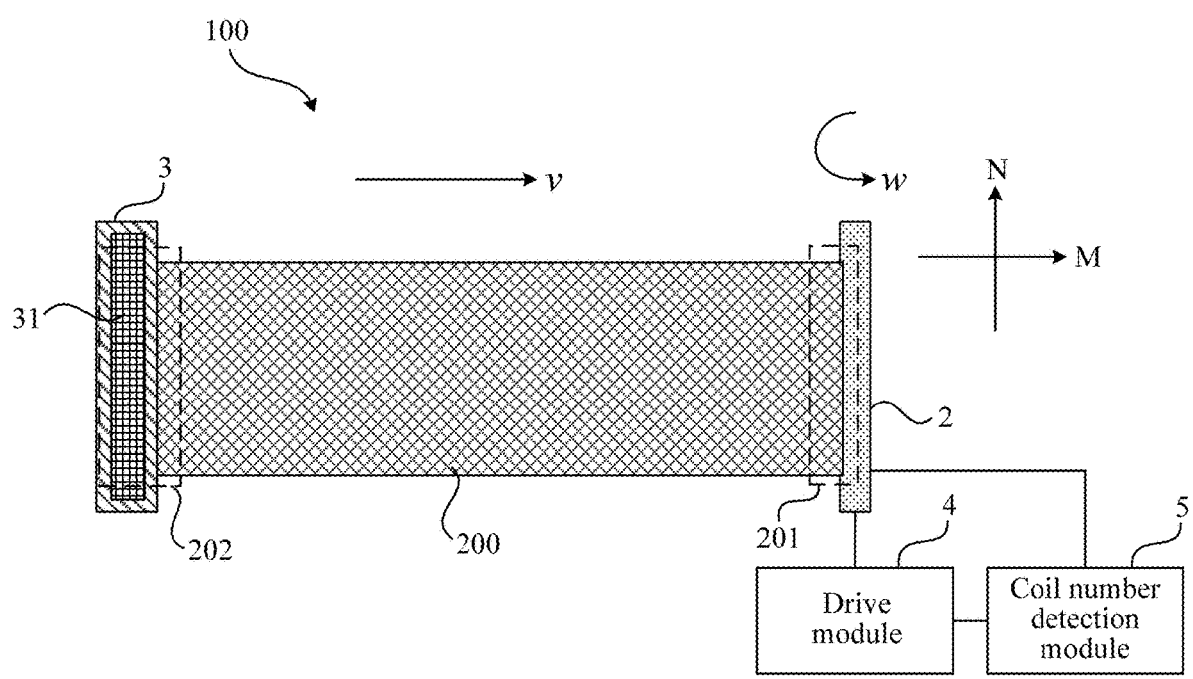
FIG. 5 is another top view illustrating the structure of an apparatus for testing a flexible screen according to an embodiment of the present application.

In an embodiment, FIG. 5 is another top view illustrating the structure of the apparatus for testing a flexible screen according to an embodiment of the present application. Referring to FIG. 5, the testing apparatus also includes a coil number detection module 5 configured to detect the number of coils of the flexible screen 200 on the reel 2 and generate a coil number detection signal. The drive module 4 is also configured to adjust the rotation velocity ω of the reel 2 according to the coil number detection signal received.

As the number of coils of the flexible screen 200 on the reel 2 increases, a coil radius of the flexible screen 200 will increase. The coil number detection module 5 detects the number of coils of the flexible screen 200 on the reel 2 and generates the coil number detection signal. The coil number detection signal includes the corresponding angular velocity matching signal of the reel 2 output according to a matching relationship between the number of coils and the coil radius of the flexible screen 200. Moreover, the drive module 4 adjusts the angular velocity ω of the rotation of the reel 2 according to the received coil number detection signal. In an embodiment, the number of coils is the one: ω=V/R; the number of coils is two: ω=V/(R+d); the number of coils is three: ω=V/(R+2d), R denotes the radius of the reel 2. ω denotes the angular velocity of the reel 2. V denotes a horizontal moving velocity. d denotes the thickness of the flexible screen 200. The coil number detection module 5 detects the number of coils to cooperate with the drive module 4 to adjust the angular velocity of reel 2, so as to match the angular velocity of the rotation of the reel 2 with the number of coils of the flexible screen 200. Therefore, the accuracy of the testing is ensured.

Figure 6:
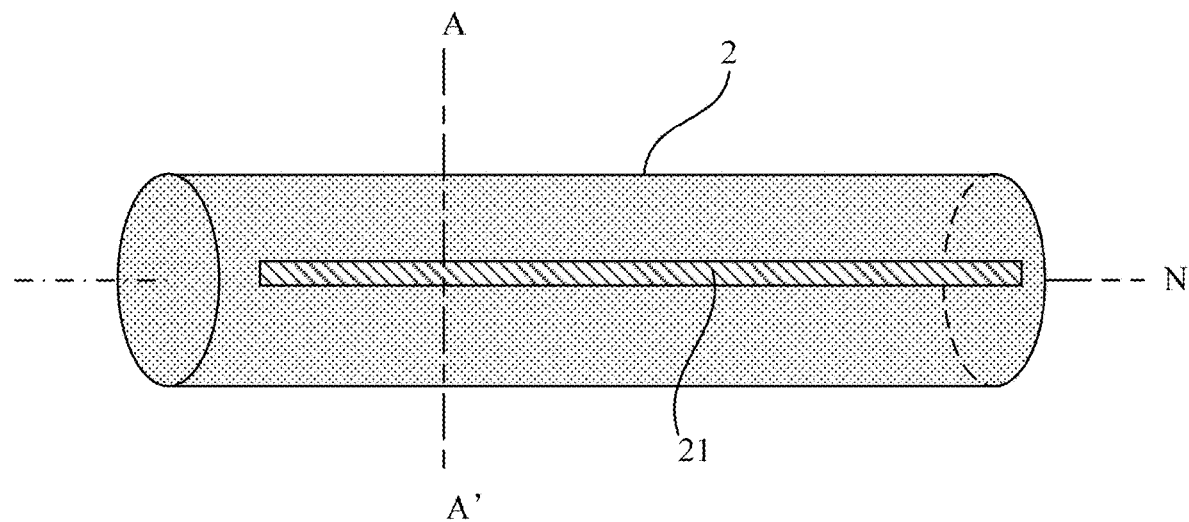
FIG. 6 is a schematic view illustrating the structure of the reel of an apparatus for testing a flexible screen according to an embodiment of the present application.
Figure 7:
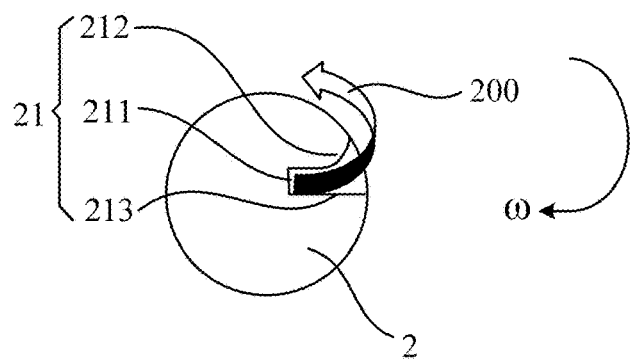
FIG. 7 is a section view taken along A-A' to illustrate the structure of the reel of an apparatus for testing a flexible screen according to an embodiment of the present application.

In an embodiment, FIG. 6 is a structure view of the reel of the apparatus for testing a flexible screen according to an embodiment of the present application. FIG. 7 is a structure view of a cross-section of the reel in the A-A' direction of the apparatus for testing a flexible screen according to an embodiment of the present application. In conjunction with FIG. 6 and FIG. 7, the reel 2 is disposed with a slot 21. An extension direction of the slot 21 is parallel to the axial direction N of the reel 2. The first end 201 of the flexible screen 200 is fixed on a surface 211 of the slot 21 adjacent to an axis of the reel 2. The reel 2 rotates to drive the flexible screen 200 to fit to the reel 2 and coil around the reel 2 through the slot 21.

The surface 211 of the slot 21 adjacent to the axis of the reel 2 secures the first end 201 of the flexible screen 200 in a pneumatic or a mechanical manner. Therefore, the first end 201 of the flexible screen 200 is secured on the surface 211 adjacent to the axis of the reel 2 in the slot 21. When the reel 2 rotates, the first end 201 of the flexible screen 200 is not easily slid out of the slot 21. Therefore, the first end 201 of the flexible screen 200 is firmly secured in the slot 21 of the reel 2, so as to drive the flexible screen 200 to fit around and coil around the reel 2 through the slot 21, thereby ensuring a smooth curling movement of the flexible screen 200.

In an embodiment, referring to FIG. 7, the slot 21 includes a first side wall 212 and a second side wall 213 sequentially disposed in a rotation direction of the reel 2. The first side wall 212 is bent in a direction opposite to the rotation direction of the reel 2. A curvature of the bent first side wall 212 is the same as a curvature of the reel 2. In FIG. 7, the case that the rotation direction of the reel 2 is clockwise is illustrated. The first side wall 212 is bent in the direction opposite to the rotation direction of the reel 2, that is, the first side wall 212 bends in a counterclockwise direction.

The first side wall 212 is bent in the direction opposite to the rotation direction of the reel 2. Therefore, when the reel 200 drives the flexible screen 200 to curl, the first end 201 of the flexible screen 200 that is close to the first side wall 212 bent in the direction opposite to the rotation direction of the reel 2 starts to curl, thereby reducing the problem that the initial position of the first end 201 of the flexible screen 200 is damaged due to excessive bending angle and uneven local force.

The curvature of the bent first side wall 212 is the same as the curvature of the reel 2. Therefore, the curling radius of the initial position of the first end 201 of the flexible screen 200 is large enough. The first end 201 of the flexible screen 200 at the slot 21 of the reel 200 can be effectively prevented from being damaged due to excessive bending angle and uneven local force on the flexible screen 200, thereby improving the accuracy of the curling performance evaluation of the flexible screen 200.

What is claimed is:
1. An apparatus configured to test a flexible screen, the apparatus comprising:
    a slide rail;
    a reel, wherein the reel is secured to an end of the slide rail, an axial direction of the reel is perpendicular to an extension direction of the slide rail, the flexible screen comprises a first end and a second end which are disposed opposite to each other, and the reel is configured to fix the first end of the flexible screen and rotate to drive the flexible screen to both fit to the reel and coil around the reel;
    a clamp, wherein the clamp is configured to clamp the second end of the flexible screen, the reel is further configured to rotate to drive, through the flexible screen, the clamp to slide along the slide rail in a direction towards the reel, and the clamp comprises a pressure sensor configured to detect tension received by the flexible screen in the extension direction of the slide rail and generate a tension detection signal; and a driver configured to adjust a rotation angular velocity of the reel according to the tension detection signal.

2. The apparatus of claim 1, wherein the clamp further comprises:
a first clamp and a second clamp which are disposed opposite to each other, wherein the first clamp and the second clamp are located on two sides of a clamped portion of the flexible screen; and the pressure sensor further comprises:
a first pressure sensor and a second pressure sensor, wherein the first pressure sensor is disposed in the first clamp and the second pressure sensor is disposed in the second clamp.

3. The apparatus of claim 2, wherein both the first pressure sensor and the second pressure sensor further comprises a resistance strain gauge.

4. The apparatus of claim 3, wherein at least one of the first clamp or the second clamp further comprises a vacuum adsorbent layer located on a side of a corresponding pressure sensor facing the flexible screen, wherein the vacuum adsorbent layer is disposed in contact with a corresponding surface of the flexible screen and the vacuum adsorbent layer is configured to perform vacuum adsorption on the corresponding surface.

5. The apparatus of claim 3, wherein both the first clamp and the second clamp further comprises a resilient element, a resilient element of the first clamp and a resilient element of the second clamp are disposed opposite to each other and both the first clamp and the second clamp are is located on a side of a corresponding pressure sensor facing away from the flexible screen.

6. The apparatus of claim 2, wherein at least one of the first clamp or the second clamp further comprises:
a vacuum adsorbent layer located on a side of a corresponding pressure sensor facing the flexible screen, wherein the vacuum adsorbent layer is disposed in contact with a corresponding surface of the flexible screen and the vacuum adsorbent layer is configured to perform vacuum adsorption on the corresponding surface.

7. The apparatus of claim 6, wherein both the first clamp and the second clamp further comprises the vacuum adsorbent layer, the vacuum adsorbent layer comprises a plurality of vacuum adsorbent holes, an edge of a side wall of each of the plurality of vacuum absorbent holes is in contact with the corresponding surface of the flexible screen, and a plurality of vacuum adsorbent holes in the first clamp and a plurality of vacuum adsorbent holes in the second clamp are disposed in a one-to-one correspondence in a direction in which the first clamp and the second clamp are disposed opposite to each other.

8. The apparatus of claim 6, wherein the vacuum adsorbent layer is a flexible material layer.

9. The apparatus of claim 8, wherein the flexible material layer is made of silica gel or ethylene propylene diene monomer.

10. The apparatus of claim 2, wherein both the first clamp and the second clamp further comprise a resilient element, a resilient element of the first clamp and a resilient element of the second clamp are disposed opposite to each other, and each resilient element is located on a side of the corresponding pressure sensor facing away from the flexible screen.

11. The apparatus of claim 10, wherein the resilient element comprises a spring.

12. The apparatus of claim 2, wherein the first pressure sensor is further configured to detect the tension received by a side of the second end of the flexible screen facing the first clamp in the extension direction of the slide rail and generate a first tension detection signal;
the second pressure sensor is further configured to detect the tension received by a side of the second end of the flexible screen facing the second clamp in the extension direction of the slide rail and generate a second tension detection signal; and
the driver is configured to adjust the rotation angular velocity of the reel according to a first tension detection signal and a second tension detection signal.

13. The apparatus of claim 12, wherein the driver is further configured to:
maintain the rotation angular velocity of the reel in a case when tension corresponding to the first tension detection signal and tension corresponding to the second tension detection signal are within a testing threshold range;
reduce the rotation angular velocity of the reel in a case when at least one of tension corresponding to the first tension detection signal or tension corresponding to the second tension detection signal is greater than a maximum value of the testing threshold range; and
increase the rotation angular velocity of the reel in a case when at least one of tension corresponding to the first tension detection signal or tension corresponding to the second tension detection signal is less than a minimum value of the testing threshold range.

14. The apparatus of claim 1, further comprising:
a coil number detector configured to detect a number of coils of the flexible screen on the reel and generate a coil number detection signal, wherein the driver is further configured to adjust the rotation angular velocity of the reel according to a coil number detection signal.

15. The apparatus of claim 14, wherein the coil number detection signal is an angular velocity matching signal of the reel obtained according to a matching relationship between the number of coils of the flexible screen and a coil radius of the flexible screen.

16. The apparatus of claim 1, wherein the reel is provided with a slot, an extension direction of the slot is parallel to the axial direction of the reel, the first end of the flexible screen is fixed on a surface of the slot adjacent to an axis of the reel and the reel is further configured to rotate to drive the flexible screen to fit to the reel and coil around the reel.

17. The apparatus of claim 16, wherein the slot comprises a first side wall and a second side wall that are sequentially disposed in a rotation direction of the reel, and the first side wall is bent in a direction opposite to the rotation direction of the reel.

18. The apparatus of claim 17, wherein a curvature of the first side wall bent is the same as a curvature of the reel.

19. The apparatus of claim 16, wherein the first end of the flexible screen is fixed in a pneumatic manner or in a mechanical manner.

20. The apparatus of claim 1, wherein the driver is further configured to:
maintain the rotation angular velocity of the reel when the tension corresponding to the tension detection signal is maintained within a testing threshold range;
reduce the rotation angular velocity of the reel when the tension corresponding to the tension detection signal is greater than a maximum value of the testing threshold range; and increase the rotation angular velocity of the reel when the tension corresponding to the tension detection signal is less than a minimum value of the testing threshold range.

* * * * *